(12) United States Patent
Nagoski et al.

(10) Patent No.: US 8,713,058 B2
(45) Date of Patent: *Apr. 29, 2014

(54) TRANSPORTING BUSINESS INTELLIGENCE OBJECTS BETWEEN BUSINESS INTELLIGENCE SYSTEMS

(75) Inventors: Stephan Jacob Nagoski, Port Moody (CA); Carlos Antonio Mejia, Vancouver (CA)

(73) Assignee: Business Objects Software Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,554

(22) Filed: Feb. 22, 2011

(65) Prior Publication Data

US 2011/0145302 A1 Jun. 16, 2011

Related U.S. Application Data

(63) Continuation of application No. 11/303,039, filed on Dec. 14, 2005, now Pat. No. 7,899,820.

(51) Int. Cl.
*G06F 7/00* (2006.01)
*G06F 17/30* (2006.01)

(52) U.S. Cl.
USPC .......................................... 707/791; 707/802

(58) Field of Classification Search
CPC ........... G06F 7/00; G06F 17/00; G06F 17/30; G06F 12/00
See application file for complete search history.

(56) References Cited

U.S. PATENT DOCUMENTS

| 6,016,393 | A | 1/2000 | White et al. | |
| 6,070,191 | A | 5/2000 | Narendran et al. | |
| 6,826,553 | B1 * | 11/2004 | DaCosta et al. | 1/1 |
| 6,842,737 | B1 | 1/2005 | Stiles et al. | |
| 6,886,169 | B2 * | 4/2005 | Wei | 719/316 |
| 6,915,301 | B2 * | 7/2005 | Hirsch | 717/100 |
| 6,947,951 | B1 * | 9/2005 | Gill | 707/803 |
| 6,954,760 | B2 * | 10/2005 | Yamashita | 707/694 |
| 7,080,092 | B2 * | 7/2006 | Upton | 1/1 |
| 7,302,639 | B1 * | 11/2007 | Everhart et al. | 707/603 |

(Continued)

FOREIGN PATENT DOCUMENTS

WO 2005089217 9/2005

OTHER PUBLICATIONS

Blanton, "Microsoft Computer Dictionary", 5th Ed., Microsoft Press, (Jan. 2002), pp. 182 and 409.

(Continued)

*Primary Examiner* — Tony Mahmoudi
*Assistant Examiner* — Tuan A Pham
(74) *Attorney, Agent, or Firm* — Mintz Levin Cohn Ferris Glovsky and Popeo, P.C.

(57) ABSTRACT

A computer readable medium includes executable instructions to create a first export file that defines attributes and relationships associated with a first business intelligence object. A second export file that characterizes a second business intelligence object associated with the first business intelligence object is formed. The first export file and the second export file are combined into a composite export entity. The composite export entity is distributed.

13 Claims, 6 Drawing Sheets

(56) References Cited

U.S. PATENT DOCUMENTS

| | | | |
|---|---|---|---|
| 7,899,820 B2* | 3/2011 | Nagoski et al. | 707/736 |
| 7,925,616 B2* | 4/2011 | Hurwood et al. | 707/600 |
| 2002/0156792 A1* | 10/2002 | Gombocz et al. | 707/100 |
| 2002/0161778 A1* | 10/2002 | Linstedt | 707/102 |
| 2003/0204487 A1 | 10/2003 | Sssv et al. | |
| 2003/0229618 A1 | 12/2003 | Judy | |
| 2004/0015908 A1 | 1/2004 | Giel et al. | |
| 2004/0047354 A1 | 3/2004 | Slater et al. | |
| 2005/0027712 A1 | 2/2005 | Gargi et al. | |
| 2005/0102292 A1* | 5/2005 | Tamayo et al. | 707/10 |
| 2005/0160361 A1* | 7/2005 | Young | 715/513 |
| 2005/0188354 A1 | 8/2005 | Finocchio | |
| 2006/0212474 A1 | 9/2006 | McCormack et al. | |
| 2006/0294153 A1* | 12/2006 | Kumar et al. | 707/200 |

OTHER PUBLICATIONS

Bouguettaya et al., "Supporting Dynamic Interactions Among Web-Based Information Sources." IEEE Transactions, vol. 12 No. 5 (Sep.-Oct. 2000).

Business Objects S.A., WO 2006/034595, International Search Report and Written Opinion (Jan. 30, 2006), 13 pgs.

Elmasri et al., "Fundamentals of Database Systems.", 2d Ed. Addison-Wesley Pub. Co., Menlo Park, CA. (1994) pp. 715-716.

Lucas et al., "Special Edition Using Crystal Enterprise 8.5", Overview, Safari Books Online, (Jan. 20, 2009), 27 pgs.

Oracle "9i Application Server: Oracle Reports", (Feb. 2001), 21 pgs.

Oracle "9i Reports: Building Reports, Release 9.0", (Oct. 2002), 69 pgs.

Oracle, "9iAS Reports Services: Publishing Reports to the Web", Release 9.0, Oracle, (Feb. 2002), 9 pgs.

* cited by examiner

TRANSPORTING BUSINESS INTELLIGENCE OBJECTS BETWEEN BUSINESS INTELLIGENCE SYSTEMS

CROSS-REFERENCE TO RELATED APPLICATIONS

This application is a continuation of U.S. patent application Ser. No. 11/303,039 filed Dec. 14, 2005 entitled "Apparatus And Method For Transporting Business Intelligence Objects Between Business Intelligence Systems," which is incorporated herein by reference in its entirety.

BRIEF DESCRIPTION OF THE INVENTION

This invention relates generally to data storage and retrieval. More particularly, this invention relates to a technique for extracting a business intelligence object from one business intelligence system and deploying the business intelligence object in another business intelligence system.

BACKGROUND OF THE INVENTION

Business Intelligence (BI) generally refers to software tools used to improve enterprise decision-making, where an enterprise may be a business, government entity, foundation, and the like. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

BI systems commonly process BI objects. A BI object is a software object that characterizes resources and data within a BI system. BI objects may include schedules, users, servers, data sources, reports, documents, files (e.g., spread sheets, graphics, data), and the like. A BI object typically contains metadata characterizing itself and/or other entities within a BI system. Metadata is information about information. Metadata typically constitutes a subset or representative values of a larger data set.

A BI object can include a metadata element, a data structure, or a combination of both. An example of a BI object that contains metadata characterizing other entities within a BI system is where a BI object characterizes an associated file. For example, the associated file could be a report—itself a BI object. BI objects include data structures, e.g., an associated file including a report, etc., and metadata elements, e.g., a BI object characterizing a data structure.

Sometimes it is desirable to move a BI object from one system to another, such as when developing content in a test system for deployment in a production system, when providing example BI objects for import to a customer system, when upgrading between two versions of a system, when moving new versions of objects from one system to another, and when backup and versioning of objects. BI object movement can be accomplished by having the source and target system simultaneously online and network accessible by a third system. In this solution, the third system exports objects from the source system, performs any required processing, and imports the objects into the target system. This solution is restrictive since both systems must be running and the import tool must be able to access both systems via a network. In addition, this solution is complicated because one or both systems may be located behind firewalls and/or may be located in physically remote locations and/or different networks. Furthermore, this solution can create a security risk as both systems may be accessible from a network.

Another problem is transporting third-party BI objects. New kinds of BI objects may be created by third-parties and published to a proprietary BI system. Frequently these new objects must be moved to other BI systems, yet the BI system designers have no prior knowledge of the structure of the BI objects. This problem can be resolved by re-writing the import tool to understand every new kind of BI object. This solution is restrictive since it is resource intensive and requires the coordination between import tool developers and all third-party BI object developers. Of course a system can be configured that does not support third-party BI objects. However, this solution restricts the extensibility of a BI system.

In view of the foregoing, it would be desirable to provide an improved technique for moving BI objects from one system to another system.

SUMMARY OF THE INVENTION

The invention includes a computer readable medium with executable instructions to create a first export file that defines attributes and relationships associated with a first business intelligence object. A second export file that characterizes a second business intelligence object associated with the first business intelligence object is formed. The first export file and the second export file are combined into a composite export entity. The composite export entity is distributed.

The invention also includes a computer readable medium with executable instructions to receive a composite export file including a first export file that defines attributes and relationships associated with a first business intelligence object and a second export file that characterizes a second business intelligence object associated with the first business intelligence object. The first business intelligence object and the second business intelligence object are merged into an object hierarchy of a target business intelligence system.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
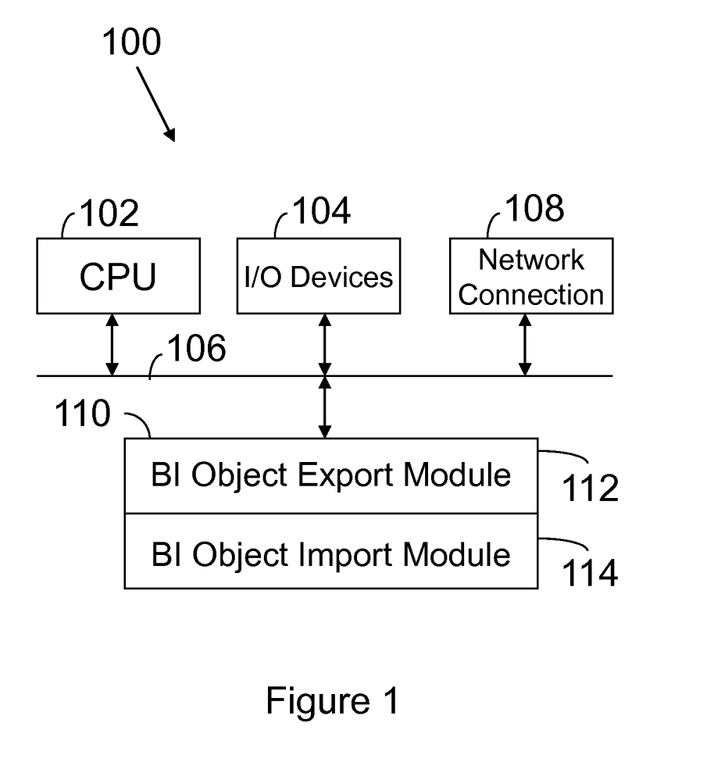
FIG. 1 illustrates a computing system configured in accordance with an embodiment of the invention.

FIG. 1 illustrates a system 100 configured in accordance with an embodiment of the invention. The system 100 includes a central processing unit 102 connected to a set of input/output devices 104 via a bus 106. The input/output devices 104 include standard components, such as keyboard, mouse, display, printer, and the like. Also connected to the bus 106 is a network connection circuit 108, which provides connectivity to a network (not shown). Thus, the system 100 may operate in a networked environment as either a client or a server. Also connected to the bus 106 is a memory 110. The memory 110 stores executable instructions to implement operations of the invention. In particular, the memory stores executable instructions defining a BI object export module 112 and/or executable instructions defining a BI object import module 114.

Figure 2:
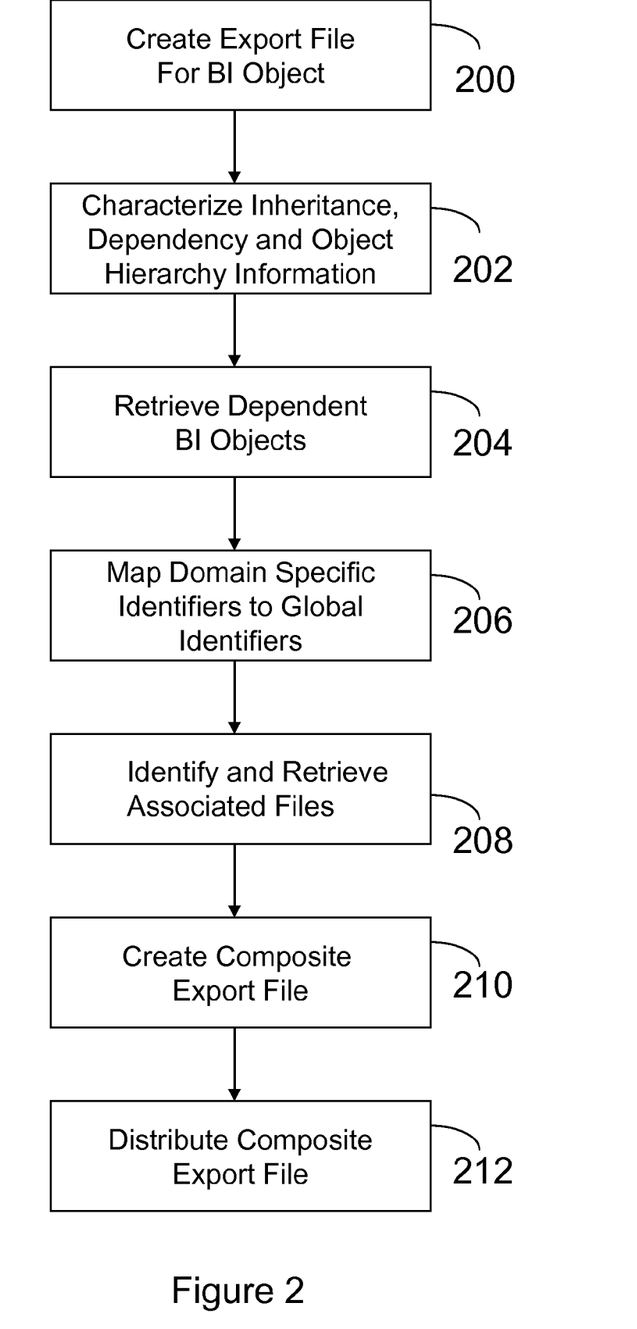
FIG. 2 illustrates processing operations associated with an export process configured in accordance with an embodiment of the invention.

FIG. 2 illustrates processing operations associated with one embodiment of a BI export module 112 configured in accordance with an embodiment of the invention. Initially, an export file is created for a BI object 200. For simplicity, the invention discusses the processing of one BI object. Naturally, the invention is also applicable to the processing of multiple BI objects. The BI object is an object that will be ported from a source system to a target system. The BI object is characterized within an export file, which may be a text file or an Extensible Markup Language (XML) file. The export file includes content associated with the BI object that the target system will need to reconstruct the BI object. The file structure used in accordance with an embodiment of the invention allows the BI object to be ported in any number of ways.

By way of example, various types of BI objects may be utilized in accordance with the invention, including:

user object—specifying a user connections object—representing connections to a database dynamic cascading prompt object—characterizing user prompts in a user interface glossary term object—representing a glossary term for an encyclopedia application logon session object—representing information about a user logon session relationship object—governing how objects relate to each other report object—representing information about a report file object—representing information about a file Each kind of BI object may use a rules file. The rules file defines the structure of the BI object. Thus, the rules file creates a representation of an object and allows for the reconstruction of the object from its representation in the export file. The rules file is meta-metadata, that is information about information on information. In an embodiment where an object is characterized within an XML file. The rules file can be a XML Schema Definition (XSD) file. The use of rules files allows for the importation and exportation of BI objects that were designed independently of the core business enterprise system. The use of rules files allows for more flexible code that can be updated in part by supplying new rules.

Below is an example of a rule file for a metadata element defined as "Name". In this case the rule (a meta-metadata element) is expressed as XSD for a metadata element stored in XML.

```
<xs:element name="Name">
    <xs:complexType>
        <xs:simpleContent>
            <xs:restriction base="StringProperty">
                <xs:attribute name="nameID" type="xs:string"
```

```
                    use="optional"
                    fixed="SI_NAME"/>
            </xs:restriction>
        </xs:simpleContent>
    </xs:complexType>
</xs:element>
```

The rule includes tags specifying an element name, complex type, simpleContent, a restriction and an attribute name. Based upon this rules file, an export file for a name defining a statement of account may be expressed as <io:Name>Statement of Account</io:Name>.

Next, inheritance, dependency and hierarchy information associated with the BI object is characterized 202. The BI object dependencies are identified. This may be implemented using the inheritance, dependency and hierarchy information. Subsequently, the dependent BI object are retrieved 204. Each dependent BI object is parsed for additional dependent BI objects. If additional dependent objects are found, the dependency and hierarchy information associated with these BI objects are characterized.

Some BI objects require the presence of other objects in order to function. These dependencies may not be apparent to the end user who is exporting BI objects. The BI object export module 112 includes executable instructions to automatically identify and export information about objects on which the chosen object has a dependency. The dependencies are reconstructed when the set of objects are imported into the target system. This functionality ensures that the exported object preserves functionality when it is imported to a new system.

In one implementation, the BI object export module 112 includes executable instructions to identify any element in an object that references another object. For example, an object may form part of a dependency tree. In this case, the BI object export module 112 progresses through the dependency tree until all dependent objects are identified. For example, the BI object export module 112 may be configured to assume that elements of the following type are references to dependent objects: local identifiers and global identifiers. In this case, the objects with these identifiers will be exported. Preferably, the BI object export module 112 is programmable to specify an acceptable depth of analysis into a dependency tree. If a dependent object cannot be located within a system, the BI object export module 112 preferably notes an error upon import. Optionally, the BI object export module 112 is programmable to export only those BI objects needed for export. For example, the BI object export module 112 may time stamp a list of objects, but only export those objects that have been updated since the time stamp.

Figure 4:
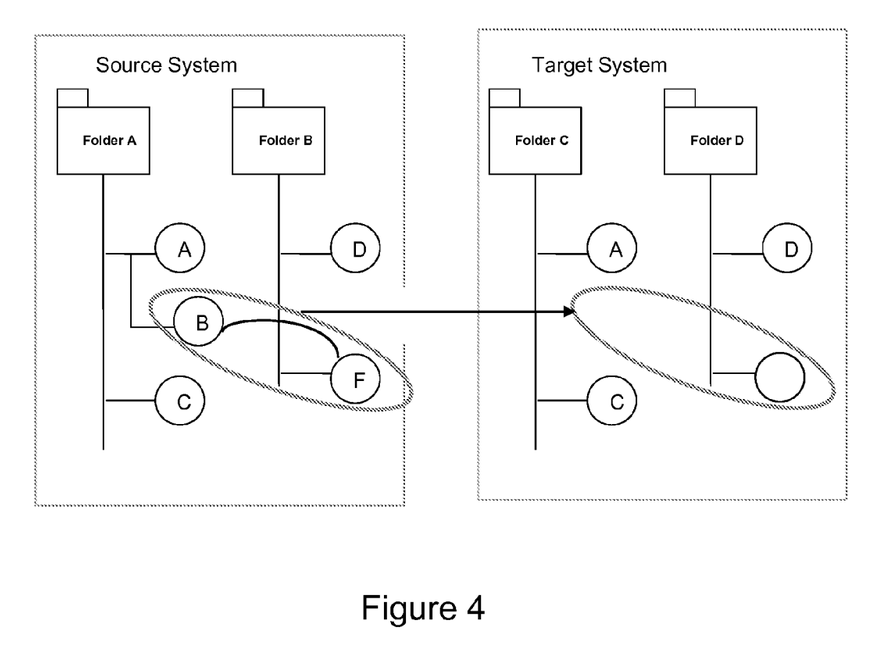
FIG. 4 illustrates the processing of object dependencies in accordance with an embodiment of the invention.

FIG. 4 illustrates a source system in which object B within Folder A is dependent upon object F within Folder B. The object dependency between objects B and F is identified. The composite export file includes information on these objects so that they may be constructed in the target system.

BI objects are organized into hierarchies. Hierarchies are another form of dependency. Hierarchies are important as they impact how the system interacts with the object, including: navigation through the set of objects, how security is applied to the object, how objects interact with and affect the behavior of other objects, and whether the object is displayed in certain user interface pages.

Figure 5:
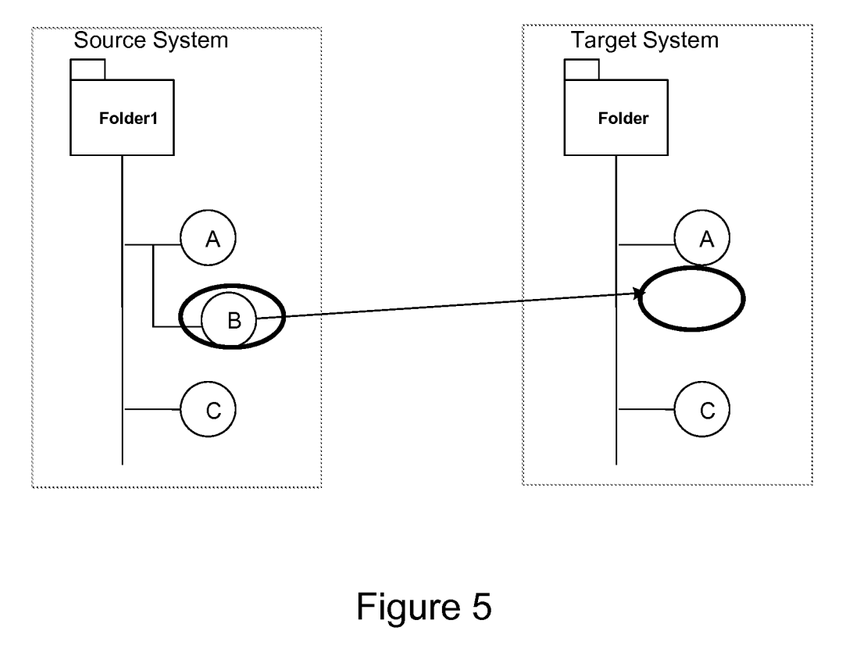
FIG. 5 illustrates the preservation of object hierarchies in accordance with an embodiment of the invention.

FIG. 5 illustrates a source system with an object B dependent upon object A. The BI object export module 112 notes this hierarchical dependency and insures that the composite export file preserves this dependency in the target system. In particular, when the object B is exported, it preserves its dependency on object A in the target system. Specifically, as shown in FIG. 5, when object B is imported into the target system, it is placed in the correct position in the target system's hierarchy, even if the source and target system hierarchies are not identical.

Security may also be considered a form of dependency. A user or user group has a set of rights on a BI object that controls what actions the user can take with that object. Preferably, the BI object export module 112 preserves these security settings when exporting the BI objects such that the reconstructed BI objects are secured in the same way for the same user in the imported system. For example, a file that has been modified will not be imported. A user's security settings are preserved on export and are reapplied on import.

After the BI object dependency operations of block 204 are performed, domain specific identifiers for the BI object may be mapped to global identifiers 206. This operation supports the porting of a BI object developed by a third-party. Domain specific identifiers provide a means for uniquely identifying BI objects. Some types of BI object identifiers provide unique identification within a single business enterprise system, while others provide unique identification globally across all business enterprise systems. The BI object export module 112 performs any required conversions on these identifiers, such that they are guaranteed to be unique where required, but also so the relationships and dependencies between the BI objects are preserved. In particular, domain specific identifiers are mapped to global identifiers. For example, object identifications may be unique within a single cluster, while cluster object identifications are unique across a set of clusters. Because object identifications are not valid in a new system, the BI object export module 112 may convert all object identifications to cluster object identifications. Upon import, the target system converts cluster object identifications to domain specific object identifications.

Next, associated files that are required for the export operation are identified and retrieved 208. Associated files include those files that characterize objects that a BI object relies upon to operate correctly. Thus, these files include files that characterized dependent objects or hierarchical objects that are required for proper operation, as discussed above. That is, previous processing operations identified objects related to a BI object that is to be exported. This operation identifies and/or creates files that characterize the related objects.

A composite export file is created 210. Optionally, the export file and any associated files are compressed. The export file and associated files may be combined into a single file prior to compression. Alternately, the export file and any associated files may be combined into a logical grouping of files after compression. Regardless of the technique used, combined files are referred to as a composite export file. The composite export file may be compressed via a lossless data compression scheme such as run length encoding, e.g., ZIP, LZW, or Huffman encoding. Optionally, the composite export file is encrypted. The export file and the associated files can be encrypted prior to the composite export file's creation, or the composite export file itself can be encrypted.

Finally, the composite export file is distributed 212. The composite export file may be distributed in any number of ways, including the downloading of the export file to the target system, sent by (secure) file transfer protocol, down or up loaded to a web resource, stored on a computer readable medium and physically transported, or the emailing of the export file to the target system. For example, the composite export file may be sent by the BI object export module 112 to the network connection circuit 108 for delivery to a specified network computer.

Figure 3:
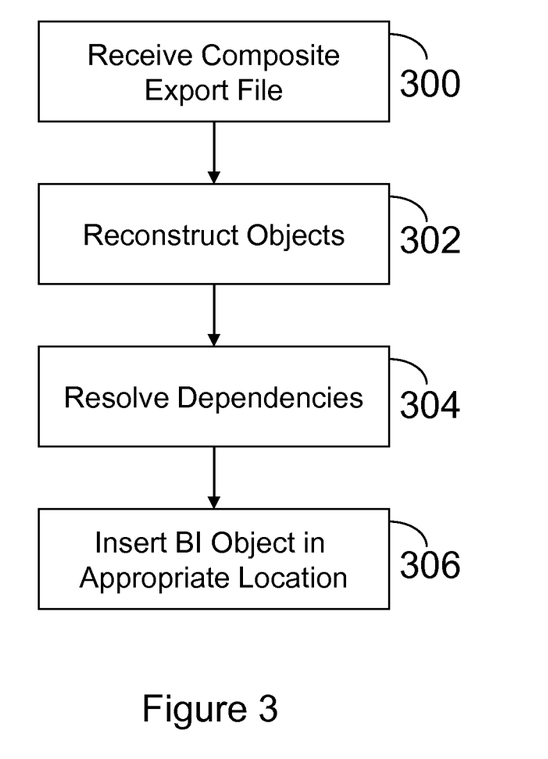
FIG. 3 illustrates processing operations associated with an import process configured in accordance with an embodiment of the invention.

FIG. 3 illustrates processing operations associated with a BI object import module 114. Initially, a composite export file is received 300. The composite export file may be received at any networked computer that supports the operations of the BI object import module 114. Alternately, the composite export file may be received at a different process operating on the same machine that generated the composite export file.

The object or objects defined by the composite export file are then reconstructed 302. Dependencies between the objects are then resolved 304. Finally, the object or objects are placed in the appropriate hierarchical location or locations within the target system 306, such as shown in FIG. 5.

The invention can update objects in the target system as well as create new ones. If the object being imported already exists in the target system, then the BI object import module 114 will not replace the existing object, but will optionally update it based on the contents of the new object. The export file can be used to specify whether an update or over-write will occur or whether the object in the target system will take precedence.

An existing object may be merged with a new object. The merged object will contain all the properties from both the existing and the new object (i.e., no properties will be deleted), but the new object's properties will take precedence over the existing object's properties should any differences exist. For example, consider an existing object with properties "a, b, c". An object to be imported has properties "a', x, y" (where a' is a new version of property a). In this example, the merged object will have the properties a', b, c, x, and y. This conversion process preserves all business intelligence meaning of the object or set of objects, including security, metadata values, inheritance, relationships, and dependencies.

Figure 6:
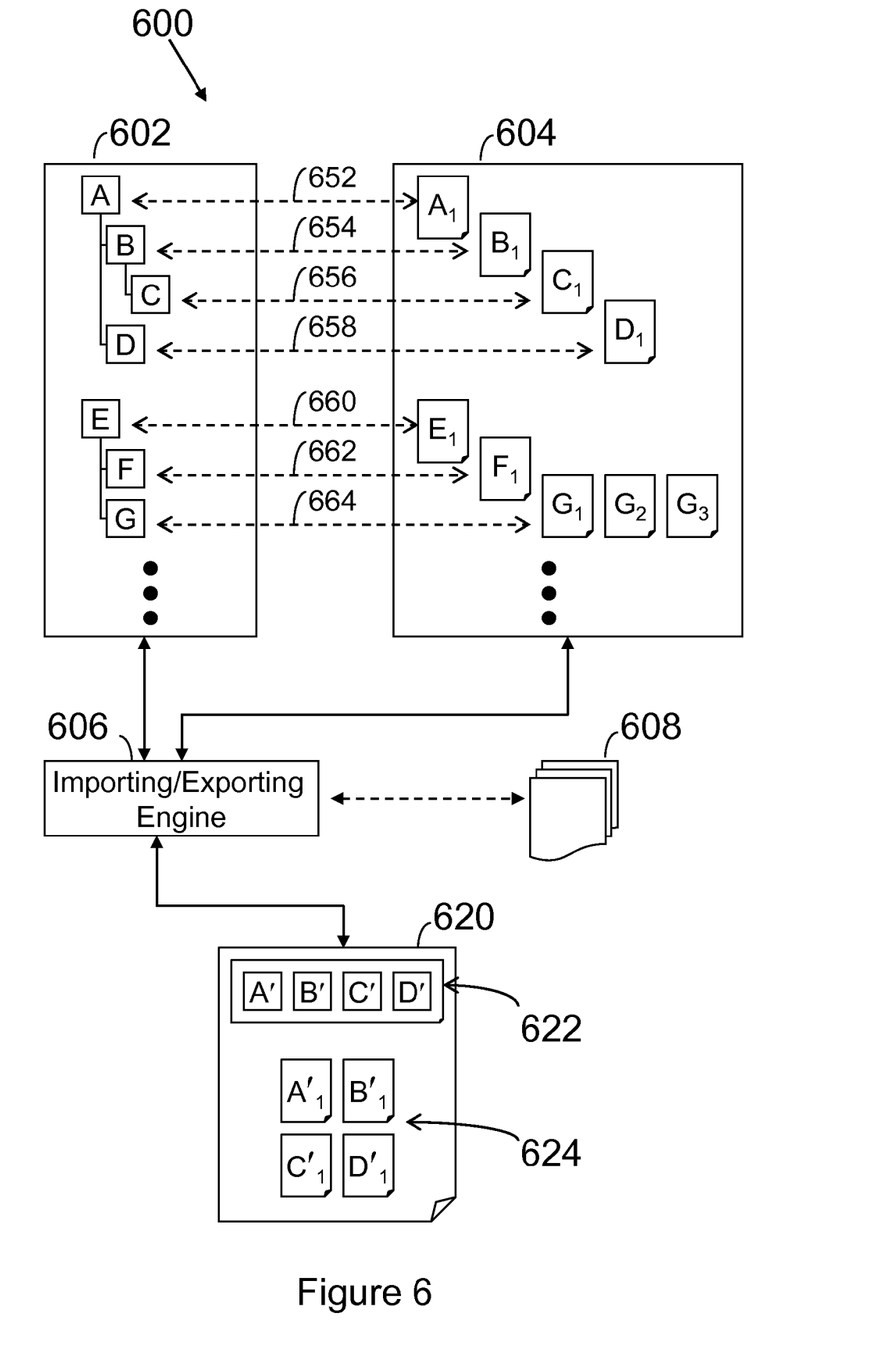
FIG. 6 illustrates an overview of a system for transporting business intelligence objects between business intelligence systems in accordance with an embodiment of the invention.

FIG. 6 illustrates an overview of a system for transporting business intelligence objects between business intelligence systems in accordance with an embodiment of the invention 600. A plurality of BI objects is shown in a first region (e.g., an object management server) 602. A second region (e.g., a file repository server) 604 stores a plurality of files characterized by BI objects. The contents of these regions can be fed into an importing/exporting engine 606 (e.g., a combination of the BI object export module 112 and BI object import module 114). The engine 606 uses a series of rule files 608 to create a composite export file 620. The export process takes data from the first region 602 and second region 604, processes the data in engine 606 and creates an export file 620. The import process is the reverse.

The contents of the two regions are related. The first region 602 stores a plurality of BI objects. These objects contain the metadata on files stored in the second region 604. The BI objects have associations, dependencies, and hierarchies, e.g., the tree with objects A, B, C and D. The second region 604 stores a plurality of associated files characterized by each BI object in the first region 602. The associated files in the second region 604 are the data for the metadata in the objects in the first region. As shown, the associated files in the second region 604 have no record of their hierarchy, instead they rely on the BI objects in the first region 603. For example, the tree with objects A through D is paired with files $A_1$ through $D_1$, as shown by arrows 652 through 658. In some embodiments, the mapping between objects and files in the two regions is not one to one. For example, object G in region 602 has three files $G_1$ through $G_3$ in region 604, as shown with arrow 664. A file may also have many associated objects.

The types of files stored in the first region 604 include BI application, report, spread sheet, word processing, graphics, text document, data, and comma delimited files. The types of file stored in the second region 604 include application specific files and documents, e.g., BI application files. For example this can include files and documents specific to Business Objects Web Intelligence™, Crystal Reports™, Business Objects OLAP Intelligence™, Business Objects Web Intelligence™, Business Objects Desk Intelligence™ or Business Objects Enterprise™. Another type of file stored in the second region 604 includes program files, e.g., binary encoded computer instructions.

The processing operations of FIGS. 2 and 3 occur in the importing/exporting engine 606. The engine 606 uses a series of rule files 608. The rule files 608 can be a collection of meta-metadata, e.g., XSD files for XML files. The rule files permit the code implementing the importing/exporting engine 606 to be flexible, e.g., new type of object can easily be handed by parsing the associated rules.

The composite export file 620 is created by the importing/exporting engine 606. File 620 contains an export file 622 for the characterizing the BI objects for the associated files 624. The associated files in the composite export file 620 are being exported from, or imported to, region 604. The associated files may have their file names changed. For example, a file may be labeled "ID.NNN", where "ID" is the global identifier for the particular file and "NNN" is the number of the particular file, e.g., for the case where more than one file of a type are exported. A file may have more than one extension. Those skilled in the art will recognize a number of advantages associated with the invention. For example, the invention provides a technique for moving business objects, which does not require multiple systems to be simultaneously operative and communicative. Rather, the export entities of the invention can be created at one point in time and then be utilized at another point in time. If the export entity is already exported, the source entity need not even be operative when the export entity is utilized by the target system. The export entity of the invention easily traverses firewalls and other networked components. In addition, the identifier mapping techniques of the invention support the deployment and porting of third-party objects within a BI system.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable medium, comprising executable instructions to:
    create a first export file that defines attributes and relationships associated with a first business intelligence object in a source system;
    form a second export file that characterizes a second business intelligence object associated with the first business intelligence object, the presence of the second business intelligence object being required by the first business intelligence object to function;
    combine, using a rule file associated with the first business intelligence object and a rule file associated with the second business intelligence object, the first export file and the second export file into a composite export entity that preserves dependencies between the first business intelligence object and the second business intelligence object within a hierarchy of business intelligence objects, wherein each rules file comprises meta-metadata characterizing a representation of the corresponding business intelligence object that allows for the reconstruction of the corresponding object from its representation in the composite export entity; and
    distribute the composite export entity to a target system so that the first business intelligence object and the second business intelligence object can be inserted into an object hierarchy within the target system that is not identical to an object hierarchy in the source system, the distribution comprising one or more of: downloading the composite export entity to a target system, sending the composite export entity by file transfer protocol, downloading or uploading the composite export entity to a web resource, storing the composite export entity to a computer readable medium, or emailing the composite export entity to the target system;
    wherein:
        the composite export entity is distributed by one or more of: downloading the composite export entity to a target system, sending the composite export entity by file transfer protocol, downloading or uploading the composite export entity to a web resource, storing the composite export entity to a computer readable medium, or emailing the composite export entity to the target system;
        the composite export entity further preserves security settings for at least one of the first business intelligence object and the second business intelligence object, the security settings defining what actions a user can take with the corresponding business intelligence object.

2. The non-transitory computer readable medium as in claim 1, wherein the attributes and relationships associated with the first business intelligence object are defined using inheritance, dependency, and hierarchy information associated with the first business intelligence object.

3. The non-transitory computer readable medium as in claim 1, wherein the composite export entity maps a first identifier for the first business intelligence object in a source system to a global identifier, the global identifier being used by a target system using the composite export entity to map to a second identifier for the business intelligence object for the target system.

4. The non-transitory computer readable medium as in claim 1, wherein at least a portion of the composite export entity is encrypted.

5. A non-transitory computer readable medium, comprising executable instructions to:
receive, by a target system from a source system, a composite export entity, the composite export entity being generated by:
creating a first export file that defines attributes and relationships associated with a first business intelligence object;
forming a second export file that characterizes a second business intelligence object associated with the first business intelligence object, the presence of the second business intelligence object being required by the first business intelligence object to function;
combining the first export file and the second export file into a composite export entity that preserves dependencies between the first business intelligence object and the second business intelligence object within a hierarchy of business intelligence objects; and
reconstruct, by the target system, the first business intelligence object and the second business intelligence object by inserting the first business intelligence object and the second business intelligence object into an object hierarchy within the target system that is not identical to an object hierarchy in the source system;
wherein:
the composite export entity is distributed by one or more of: downloading the composite export entity to a target system, sending the composite export entity by file transfer protocol, downloading or uploading the composite export entity to a web resource, storing the composite export entity to a computer readable medium, or emailing the composite export entity to the target system;
the composite export entity further preserves security settings for at least one of the first business intelligence object and the second business intelligence object, the security settings defining what actions a user can take with the corresponding business intelligence object.

6. The non-transitory computer readable medium as in claim 5, wherein the reconstructing comprises: respectively placing the first business intelligence object and the second business intelligence object into locations within a hierarchical location or locations within the target system as specified by the composite export entity.

7. The non-transitory computer readable medium as in claim 5, wherein the first export file is generated using rules associated with the first business intelligence object, the rules defining a structure of the first business intelligence object to allow for the reconstruction of the first business intelligence object in a target system accessing the composite export entity.

8. The non-transitory computer readable medium as in claim 5, wherein the attributes and relationships associated with the first business intelligence object are defined using inheritance, dependency, and hierarchy information associated with the first business intelligence object.

9. The non-transitory computer readable medium as in claim 5, wherein the composite export entity maps a first identifier for the first business intelligence object in a source system to a global identifier, the global identifier being used by a target system using the composite export entity to map to a second identifier for the business intelligence object for the target system.

10. The non-transitory transitory computer readable medium as in claim 5, wherein at least a portion of the composite export entity is encrypted.

11. A non-transitory computer readable medium, comprising executable instructions to:
access a composite export entity, the composite export entity being generated by:
creating a first export file that defines attributes and relationships associated with a first business intelligence object in a source system;
characterizing inheritance, dependency, and object hierarchy information for the first business intelligence object;
retrieving objects in the source system upon which the first business intelligence object depends including a second business intelligence object;
identify a rule file associated with the first business intelligence object, wherein the first business intelligence object is further characterized by metadata of the rule file;
forming a second export file that characterizes a second business intelligence object associated with the first business intelligence object, the presence of the second business intelligence object being required by the first business intelligence object to function;
combining the first export file and the second export file into the composite export entity such that the composite export entity preserves dependencies between the first business intelligence object and the second business intelligence object within a hierarchy of business intelligence objects; and
distribute the composite export entity to a target system so that the first business intelligence object and the second business intelligence object can be inserted into an object hierarchy within the target system that is not identical to an object hierarchy in the source system.

12. The non-transitory computer readable medium as in claim 11, wherein the composite export entity is distributed by one or more of: downloading the composite export entity to the target system, sending the composite export entity by file transfer protocol, downloading or uploading the composite export entity to a web resource, storing the composite export entity to a computer readable medium, or emailing the composite export entity to the target system.

13. The non-transitory computer readable medium as in claim 11, wherein:
the composite export entity further preserves security settings for at least one of the first business intelligence object and the second business intelligence object, the security settings defining what actions a user can take with the corresponding business intelligence object; and
the composite export entity maps a first identifier for the first business intelligence object in a source system to a global identifier, the global identifier being used by a target system using the composite export entity to map to a second identifier for the business intelligence object for the target system.

* * * * *